(12) United States Patent
Dudai

(10) Patent No.: US 6,874,888 B1
(45) Date of Patent: Apr. 5, 2005

(54) POLARIZED CONTACT LENSES WITH A CLEAR PERIPHERAL PORTION

(76) Inventor: Wendy Dudai, 2721 Bay Watch La., Navarre, FL (US) 32566

( * ) Notice: Subject to any disclaimer, the term of this patent is extended or adjusted under 35 U.S.C. 154(b) by 0 days.

(21) Appl. No.: 10/419,632

(22) Filed: Apr. 21, 2003

(51) Int. Cl.⁷ .................................. G02C 7/04
(52) U.S. Cl. ................ 351/162; 351/160 R; 351/163
(58) Field of Search .................... 351/162, 160 R, 351/163, 165, 166, 177

(56) References Cited

U.S. PATENT DOCUMENTS

| | | | |
|---|---|---|---|
| 3,034,403 A | 5/1962 | Neefe | |
| 4,252,421 A | 2/1981 | Foley, Jr. | |
| 4,304,895 A | 12/1981 | Loshack | |
| 4,576,453 A | 3/1986 | Borowsky | |
| 4,669,834 A | 6/1987 | Richter | |
| 4,702,574 A | 10/1987 | Bawa | |
| 4,707,236 A | 11/1987 | Borowsky | |
| 4,998,817 A | * 3/1991 | Zeltzer | 351/162 |
| 5,044,743 A | 9/1991 | Ting | |
| 5,189,448 A | 2/1993 | Yaguchi | |
| 5,617,154 A | 4/1997 | Hoffman | |
| 6,145,984 A | * 11/2000 | Farwig | 351/49 |
| 6,305,801 B1 | 10/2001 | Kerns, Jr. et al. | |

* cited by examiner

Primary Examiner—Hung X. Dang
(74) Attorney, Agent, or Firm—Michael I Kroll

(57) ABSTRACT

A contact lens having a clear peripheral portion and a polarized element covering the pupil area thereof in order to protect the user's eyes from harmful rays from the sun and other potentially damaging light sources. The present invention provides more comprehensive protection against harmful ultraviolet rays than sunglasses and other such devices known in the art. A tinted portion may also be included between said peripheral portion and said polarized element to enhance the color of the user's eyes.

4 Claims, 10 Drawing Sheets

POLARIZED CONTACT LENSES WITH A CLEAR PERIPHERAL PORTION

BACKGROUND OF THE INVENTION

1. Field of the Invention

The present invention relates generally to contact lenses and, more specifically, to contact lens with polarization.

On a daily basis we are constantly bombarded by glare and ultraviolet (UV) rays. Some researchers believe that long-term exposure can damage not only your skin, but your eyes too. The sun is the leading source of harmful UV rays but every day fluorescent and incandescent lights in the home or office may also produce potentially harmful effects.

Eyewear is not just a fashion statement, they also protect the eyes against glare and the sun's harmful UV rays. Exposure to the sun's UV radiation can lead to a sunburn-like condition called photokeratitis, which is normally a temporary, but uncomfortable, condition. Long-term exposure to the sun's harmful invisible rays can speed up degeneration of the macula, the focusing part of the retina, and can also lead to cataracts.

To date, eyeglasses and goggles have generally served as the means to protect us from the sun's harmful rays. Such eyewear includes various protective colorings and UV protective coatings. One of the most effective protective coatings has proven to be polarized lenses. The polarized lens reflects the vast majority of rays away from the lens and does not allow the light to penetrate through.

The present invention utilizes this known means of polarization to reflect light in the use of the contact lens. Contact lenses have many advantages over other types of eyewear and have been used increasingly to replace eyeglasses. One advantage of the use of contact lenses is that the appearance of the user remains unchanged. Without close analysis, one cannot detect a person wearing contact lenses. With contact lens tinting, one can also alter the appearance of their eye color.

Many users of contact lenses also wear sunglasses in outdoor activities to protect their eyes from UV rays. Unfortunately, the use of sunglasses does not always meet our needs. Undesirable tan lines and changes in the appearance of the user are among the disadvantages of the prior art. Furthermore, eyeglasses do not block the light from various side angles, and are prone to loss and damage.

With the use of polarized materials in contact lenses, the present invention eliminates the need to have both contact lenses for improved vision and sunglasses to protect the eye from UV light rays.

Unlike sunglasses, contact lenses are affixed directly to the eye. The contact lens is positioned over the cornea and creates a barrier. One preferred element of the present invention is to provide a polarized barrier in the center of the contact lens that is sized to the user's pupil. With such sizing, the outer circumference of the lens remains clear. When in use, the contact lens provides a natural appearance of the eye and creates a polarized barrier to protect the eye from light. Prescription corrective lenses and optional tinting of the lens may be used in conjunction with the polarized barrier eliminating the need to wear sunglasses for protection.

In another preferred embodiment of the present invention, the polarized coating is applied to the entire lens. The increased area coverage provides maximum protection of the eye.

2. Description of the Prior Art

There are other contact lenses utilized to control light. Typical of these is U.S. Pat. No. 3,034,403 issued C. W. Neefe on May 15, 1962.

A patent was issued on Feb. 24, 1981 as U.S. Pat. No. 4,252,421 to William M. Foley, Jr. Another patent was issued to William M. Foley, Jr. on Dec. 8, 1981 as U.S. Pat. No. 4,304,895.

Yet another U.S. Pat. No. 4,576,453 was issued to Richard Borowsky on Mar. 18, 1986 and still yet another was issued on Jun. 2, 1987 to Judy C. Richter as U.S. Pat. No. 4,669,834. Another patent was issued to Rajan Bawa on Oct. 27, 1987 as U.S. Pat. No. 4,702,574.

Yet another patent was issued on Nov. 17, 1987 as U.S. Pat. No. 4,707,236 to Richard Borowsky. Another patent was issued to Albert C. Ting on Sep. 3, 1991 as U.S. Pat. No. 5,044,743.

Still yet another U.S. Pat. No. 5,189,448 was issued Katsumi Yaguchi on Feb. 23, 1993 and yet another was issued on Apr. 1, 1997 to William C. Hoffman as U.S. Pat. No. 5,617,154. Another patent was issued to David V. Kerns, Jr. on Oct. 23, 2001 as U.S. Pat. No. 6,305,801.

U.S. Pat. No. 3,034,403

Inventor: C. W. Neefe

Issued: May 15, 1962

This disclosed invention relates to the field of ophthalmic optics and contact lens in particular. The object of this invention is to produce a lens which for all practical purposes will be of dark tint when worn in bright sunlight and of light overall effective tint when worn indoors under low level of illumination and at night.

U.S. Pat. No. 4,252,421

Inventor: William M. Foley, Jr.

Issued: Feb. 24, 1981

Contact lenses with a colored central area. Contact lenses and a method of preparing the same in which a central area tinted with particular polymer bound or water insoluble colorants are disclosed.

U.S. Pat. No. 4,304,895

Inventor: William M. Foley, Jr.

Issued: Dec. 8, 1981

This invention relates to ultraviolet absorbing lenses, particularly corneal contact lenses, comprising a polymeric shaped body having an ultraviolet absorbed dispersed substantially uniformly throughout said body and being in a steady state with respect to extraction thereof from said body by an aqueous medium, and to the method of making such lenses.

U.S. Pat. No. 4,576,453

Inventor: Richard Borowsky

Issued: Mar. 18, 1986

A contact is featured for use by light sensitive wearers. The lens comprises a centrally shaded portion whose shade is optically graded from a relatively darker center to a relatively light or transparent periphery. The diameter of the shade is greater than a fully contracted pupil, as when the eye is exposed to bright sunlight, but less than a fully dilated pupil, as when the eye is exposed to very dim light.

U.S. Pat. No. 4,669,834

Inventor: Judy C. Richter

Issued: Jun. 2, 1987

A contact lens which is light reflective, as opposed to transparently tinted. This type of contact lens is useful for cosmetic purposes and for decreasing the amount of glare, bright light, ultraviolet light and infrared light that could enter the eye. In a preferred embodiment, the lens is of a silvered or mirrored appearance.

U.S. Pat. No. 4,702,574

Inventor: Rajan Bawa

Issued: Oct. 27, 1987

Contact lenses having fluorescent colorants and apparatus for making such lenses. Cosmetic contact lenses, which are tinted with daylight fluorescent pigment in the area, can change the wearer's apparent iris color to any desired color, including changing a dark iris to a lighter color such as blue or green.

U.S. Pat. No. 4,707,236

Inventor: Richard Borowsky

Issued: Nov. 17, 1987

The invention pertains to an electrophoretic technique for fabricating a progressively graded concentration of dye in a hydrophilic polymeric matrix or gel. A charged dye or dye precursor is caused to migrate under the influence of an electrical potential through the gel matrix. An area is formed in the hydrogel matrix which is progressively graded in optical density as a function of the distance from the point of application to the hydrogel matrix. The insertion of the dye through the hydrogel matrix of a contact lens may be used to form a contact lens with an optically graded central spot.

U.S. Pat. No. 5,044,743

Inventor: Albert C. Ting

Issued: Sep. 3, 1991

A corrective lens system with selectable optical characteristics includes a lens element for placement in the optical path of a human eye ahead of the retina of the eye and a polarizer element for placement in the optical path of the human eye ahead of the lens element. The polarizer element is configured to pass plane polarized light toward the lens element and the lens element has first and second regions with different optical characteristics, the first region being polarized and arranged to restrict the passage of plane polarized light having other than a given direction of polarization. The lens element may be an intraocular lens, a contact lens, or a corneal implant lens, includes a polarizer element mounted on a spectacles frame as a component of an ocular telescope utilized to treat macular degeneration so that when the spectacles are worn light is restricted from passing through the first region of the lens element.

U.S. Pat. No. 5,189,448

Inventor: Katsumi Yaguchi

Issued: Feb. 23, 1993

To let one confirm the location of a contact lens which has been lost when one has intended to apply it to or remove it from the eyeball, a polarizing filter is used. The surface or side surface of a contact lens is coated with a polarizing filter so that when the contact lens has been lost, the location of the polarizing filter that is coated on the contact lens is allowed to be confirmed easily through a polarizing plate.

U.S. Pat. No. 5,617,154

Inventor: William C. Hoffman

Issued: Apr. 1, 1997

The invention relates to a light-absorbing contact lens and process for preparing same. A contact lens is tinted with colorants which provide desired spectral transmittance characteristics over the tinted portion of the lens. The contact lens provides transmittance of incident radiation having a wavelength from 500 to 700 nm which is variable and wavelength-dependent. The lens of this invention also preferably filters out ultraviolet and blue light (wavelengths from 200 to about 500 nm). Various transmittance patterns for wavelengths from 500 to 700 nm are obtainable by appropriate choice of colorant combinations; the transmittance curve in this region and the colorants to achieve the desired transmittance characteristics are chosen to fill particular needs of a wearer as for example limiting transmittance of visible light in high intensity light environments. Lenses according to the invention may provide unique benefits for use with particular applications such as sporting activities, recreational activities, or the like. Both hard and soft contact lenses are disclosed, and various examples of specialized lenses for particular applications are disclosed.

U.S. Pat. No. 6,305,801

Inventor: David V. Kerns, Jr.

Issued: Oct. 23, 2001

A contact lens has at least one optical filter region that can be surrounded by a clear optical region. The one or more filter regions have a diameter such that an increasing percentage of visible light is transmitted to the pupil of the eye as lighting conditions change from high-intensity lighting environments to low-intensity lighting environments. The cooperation between the changing pupil and lens provides an automatic adjustment of light intensity perceived by the wearer in response to the changing light conditions. Different filtering characteristics are provided in the filter regions to enhance perception of light corresponding to light reflected by an object or background scene used in outdoor sporting and recreational activities, while attenuating other reflected light.

While these lenses may be suitable for the purposes for which they were designed, they would not be as suitable for the purposes of the present invention, as hereinafter described.

SUMMARY OF THE PRESENT INVENTION

A primary object of the present invention is to provide a contact lens that protects the eye from glare and harmful light rays.

Another object of the present invention is to provide a contact lens that utilizes polarized material to protect the eye from glare and harmful light rays.

Still another object of the present invention is to provide a contact lens that positions the polarized material in the center and is concentric to the lens.

Yet another object of the present invention is to provide a contact lens with polarized material that can be used in conjunction with prescription corrective lenses.

Still another object of the present invention is to provide a contact lens with polarized material that can be used in conjunction with color tinting.

Another object of the present invention is to eliminate the need to utilize sunglasses while wearing contacts in high lighting.

Yet another object of the present invention is to provide a contact lens with polarized material that will not alter the user's appearance.

Still another object of the present invention is to provide a contact lens with polarized material that covers the entire contact lens.

Still another object of the present invention is to provide a contact lens with polarized material that is cost effective to manufacture.

Additional objects of the present invention will appear as the description proceeds.

The present invention overcomes the shortcomings of the prior art by providing a contact lens with polarized materials and improved means for protecting the eyes from harmful UV light. In addition, it provides the means to eliminate the need for sunglasses to protect the eyes.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
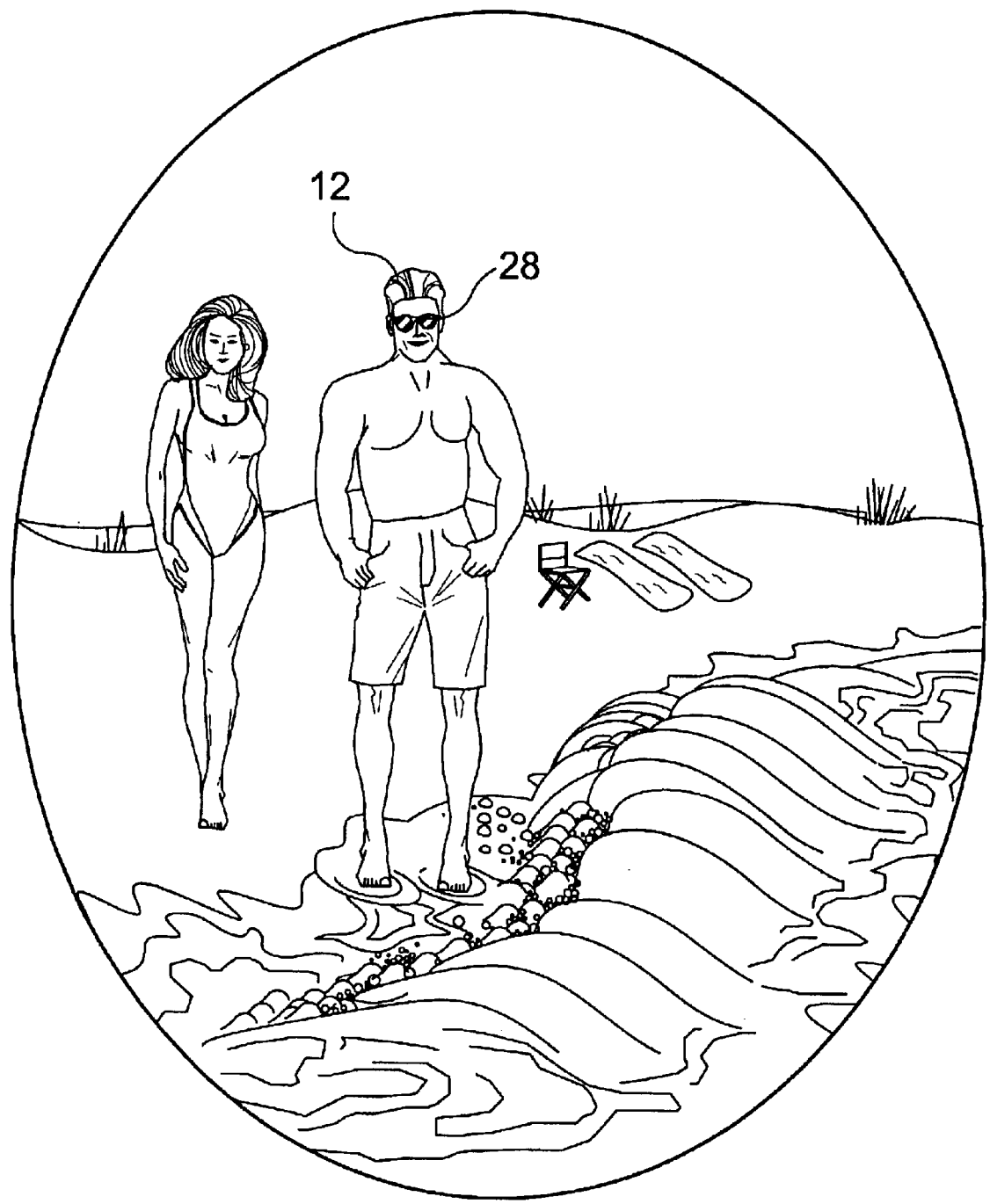
FIG. 1 is an illustrative view of the present invention, polarized contact lenses.

Turning now descriptively to the drawings, in which similar reference characters denote similar elements throughout the several views, the figures illustrate the Polarized Contact Lens of the present invention of the present invention. With regard to the reference numerals used, the following numbering is used throughout the various drawing figures.

10 Polarized Contact Lens of the present invention
12 user
14 central portion of 10
16 peripheral portion of 10
18 polarized element
20 eye of 12
22 pupil of 20
24 cornea of 20
26 iris of 20
28 polarized sunglasses of the prior art
30 ultraviolet rays
32 muscles of 20
34 optic nerve of 20
36 tinted portion of 10
38 clear portion of 10

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

FIG. 1 is an illustrative view of the present invention, polarized contact lenses 10. Sunglasses 28 are commonly utilized to combat the harmful effects of, and protect the eyes 20 from, ultraviolet light 30 during outdoor activities. Unfortunately, the frames of sunglasses 28 leave tan lines that can be undesirable. The contact lenses of the present invention 10 overcome this and other shortcomings of sunglasses 28 by utilizing a polarized film 18 that filters light, including ultraviolet light 30 and protects the user's eyes 20.

Figure 2:
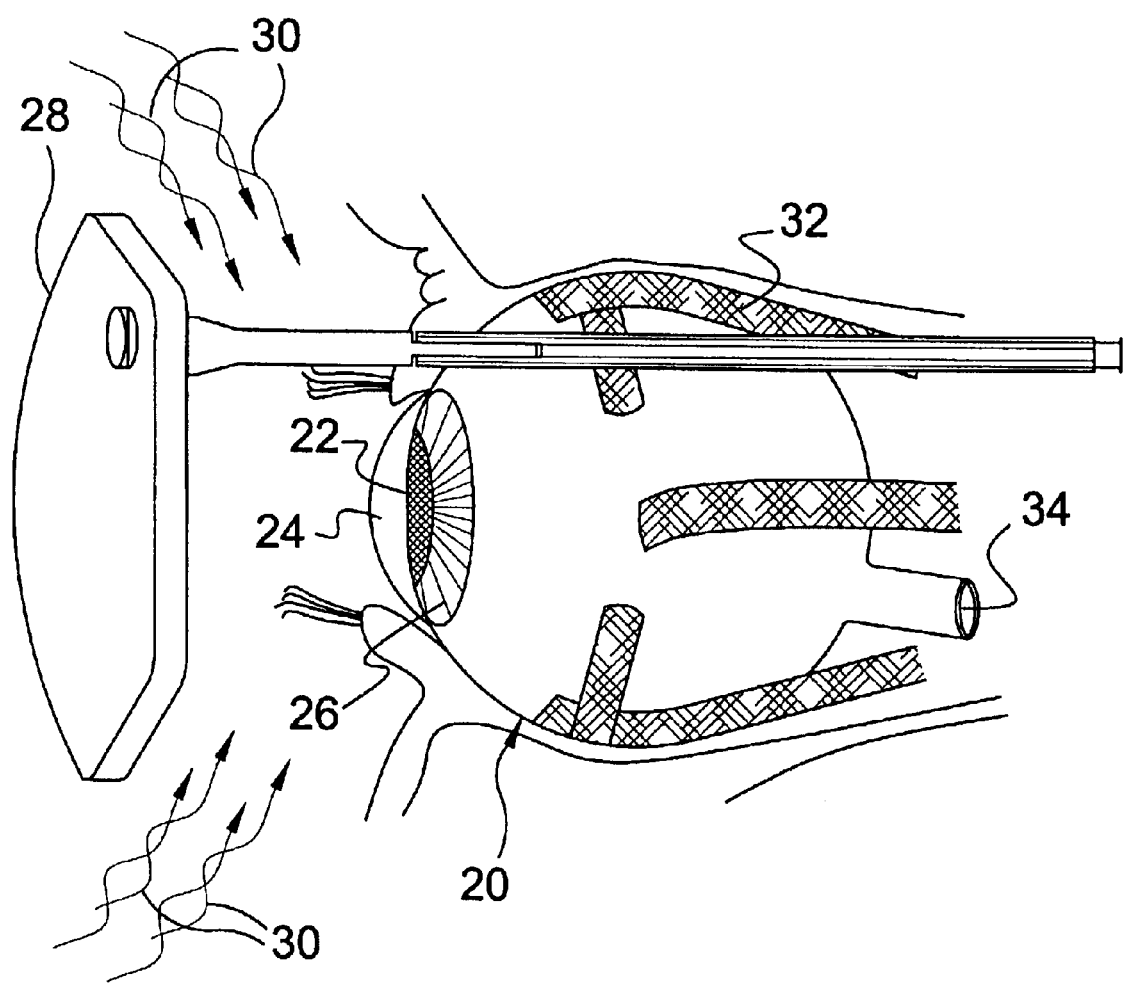
FIG. 2 is a side detail view of the eye with prior art.

FIG. 2 is a side detail view of the eye 20 with prior art. In addition to leaving undesirable tan lines, sunglasses 28 do not provide complete protection from light 30. In a normal fit, the sunglass 28 lenses are ½–¾" from the eye 20, leaving various vulnerable parts of the eye 20 exposed to glare and harmful ultraviolet light 30.

Figure 3:
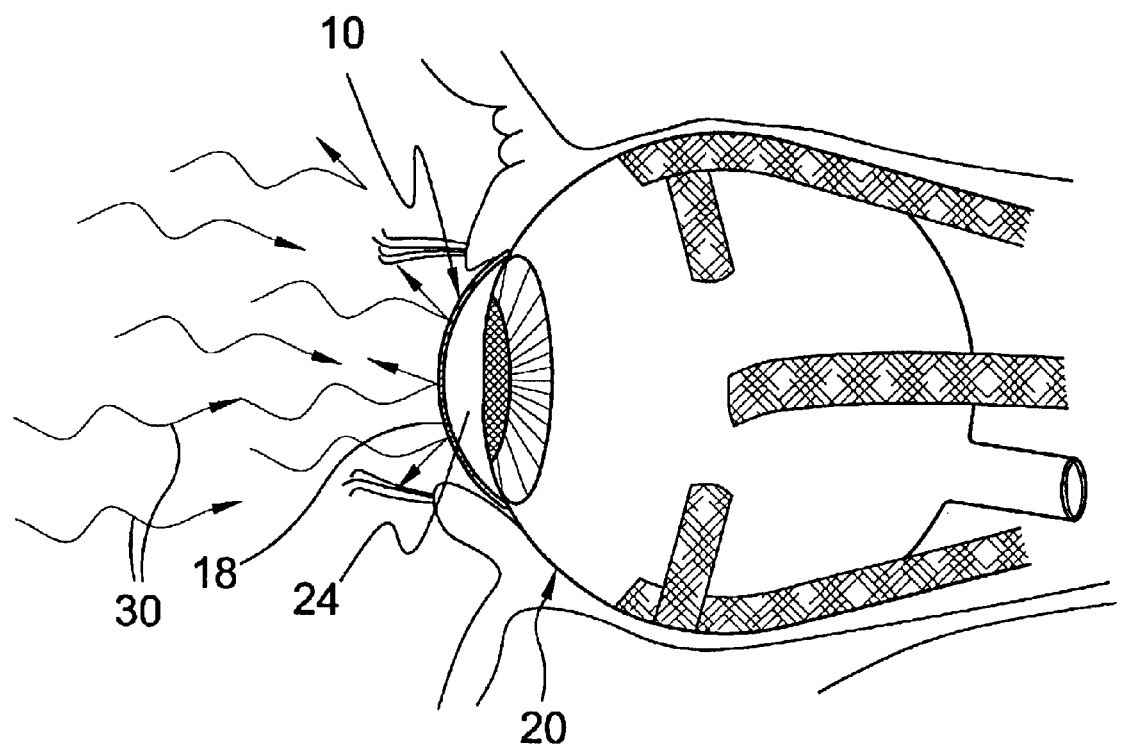
FIG. 3 is a side detail view of the eye with the present invention, polarized contact lenses.

FIG. 3 is a side detail view of the eye with the present invention, polarized contact lenses 10. Unlike sunglasses 28, contact lenses are affixed directly to the eye 20. The contact lens is positioned over the cornea 24 and creates a barrier for the other vulnerable parts of the inner eye. The polarized element 28 of the lens reflects glare and harmful ultraviolet light 30.

Figure 4:
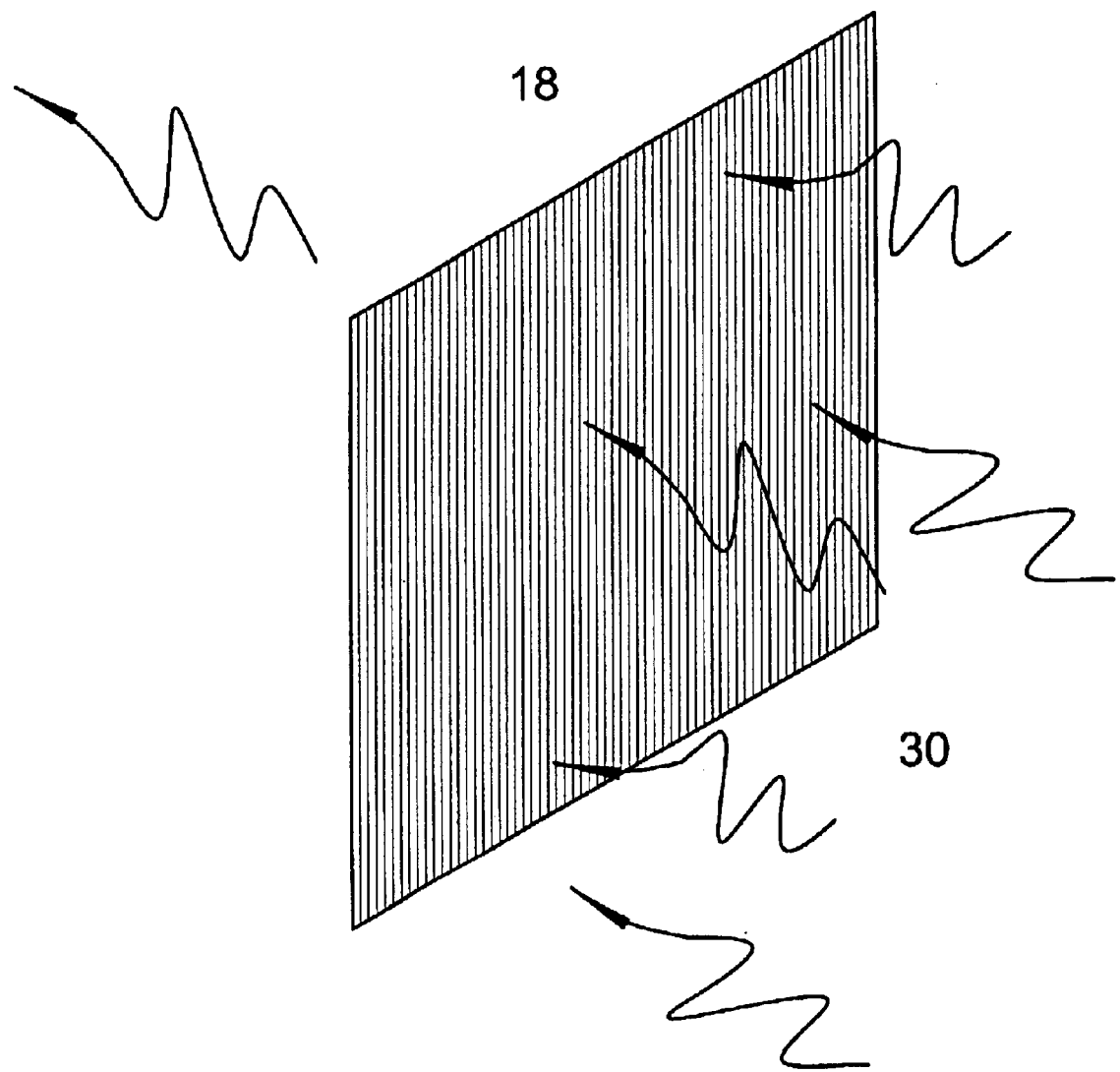
FIG. 4 is an illustrative view of polarized film and various light waves.

FIG. 4 is an illustrative view of the polarized element 18 and various light waves 30. The polarized element 18 that coats the contact lens 10 is equivalent to the function of other polarized elements 18. Light rays 30 approach from various angles. Only rays 30 approaching at a predetermined angle will pass though the polarized element 18. Thus, the vast majority of glare and ultraviolet rays 30 are reflected away. Light 30 reflected from surfaces like a flat road or smooth water is generally horizontally polarized. This horizontally polarized light 30 is blocked by the vertically oriented polarizing element 18 in the lens.

Figure 5:
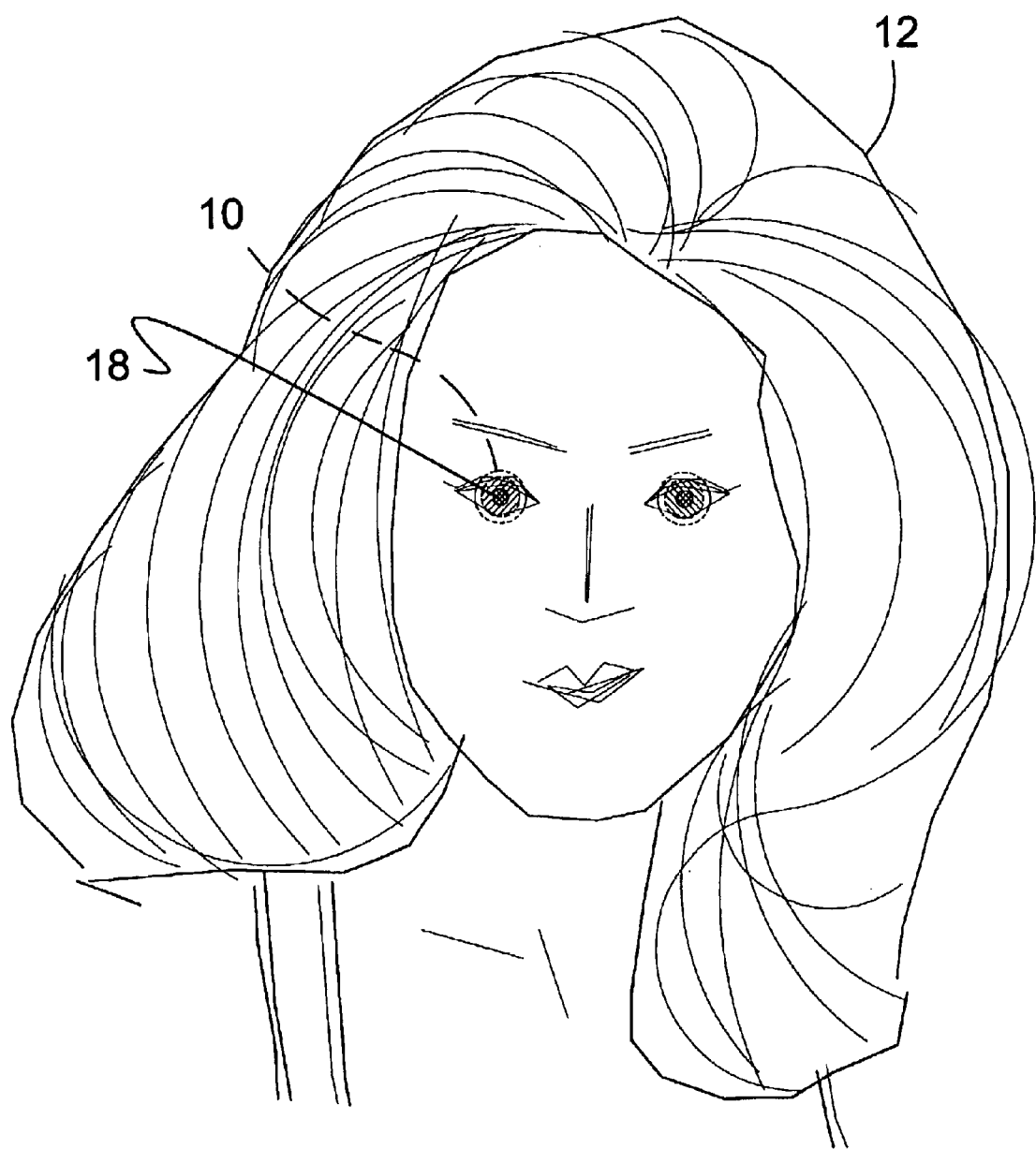
FIG. 5 is an illustrative view of the present invention, polarized contact lenses in use.

FIG. 5 is an illustrative view of the present invention, polarized contact lenses 10, in use. The polarized coating 18 is applied to the center of the lens and is sized for the user's pupil 22. In addition to glare and ultraviolet light 30 protection, the lens may include prescribed vision correction or be tinted for eye coloring.

Figure 6:
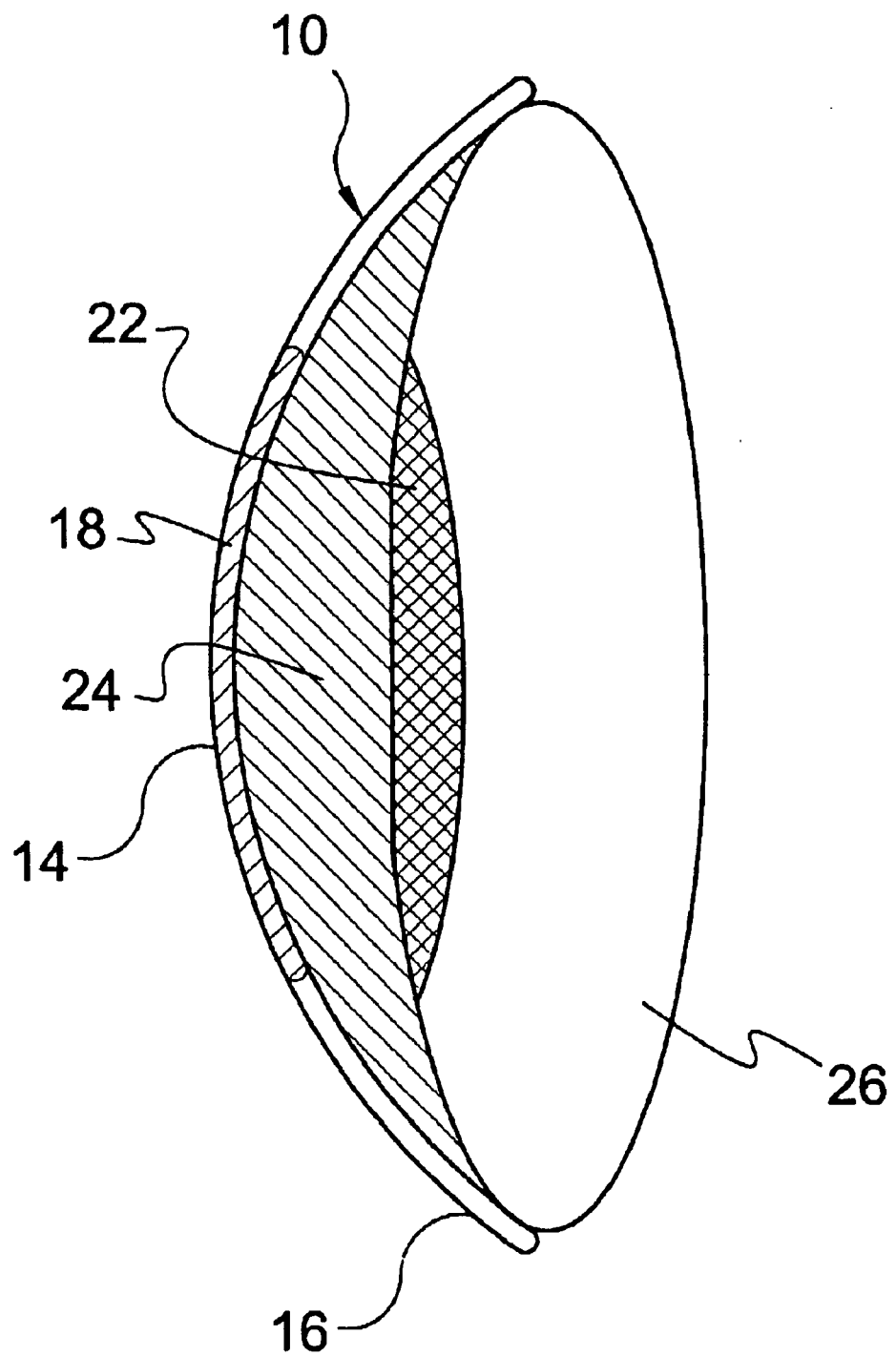
FIG. 6 is a side detail view of the eye with present invention, polarized contact lenses.

FIG. 6 is a side detail view of the eye 20 with the present invention, polarized contact lenses 10. The contact lens 10 is positioned over the cornea 24 and creates a barrier for the other vulnerable parts of the inner eye. The polarized element 18 is applied to the center portion of the lens 14 concentric with the pupil 22. Area outside the polarized element 18 is transparent or colored to suit the user's preference.

Figure 7:
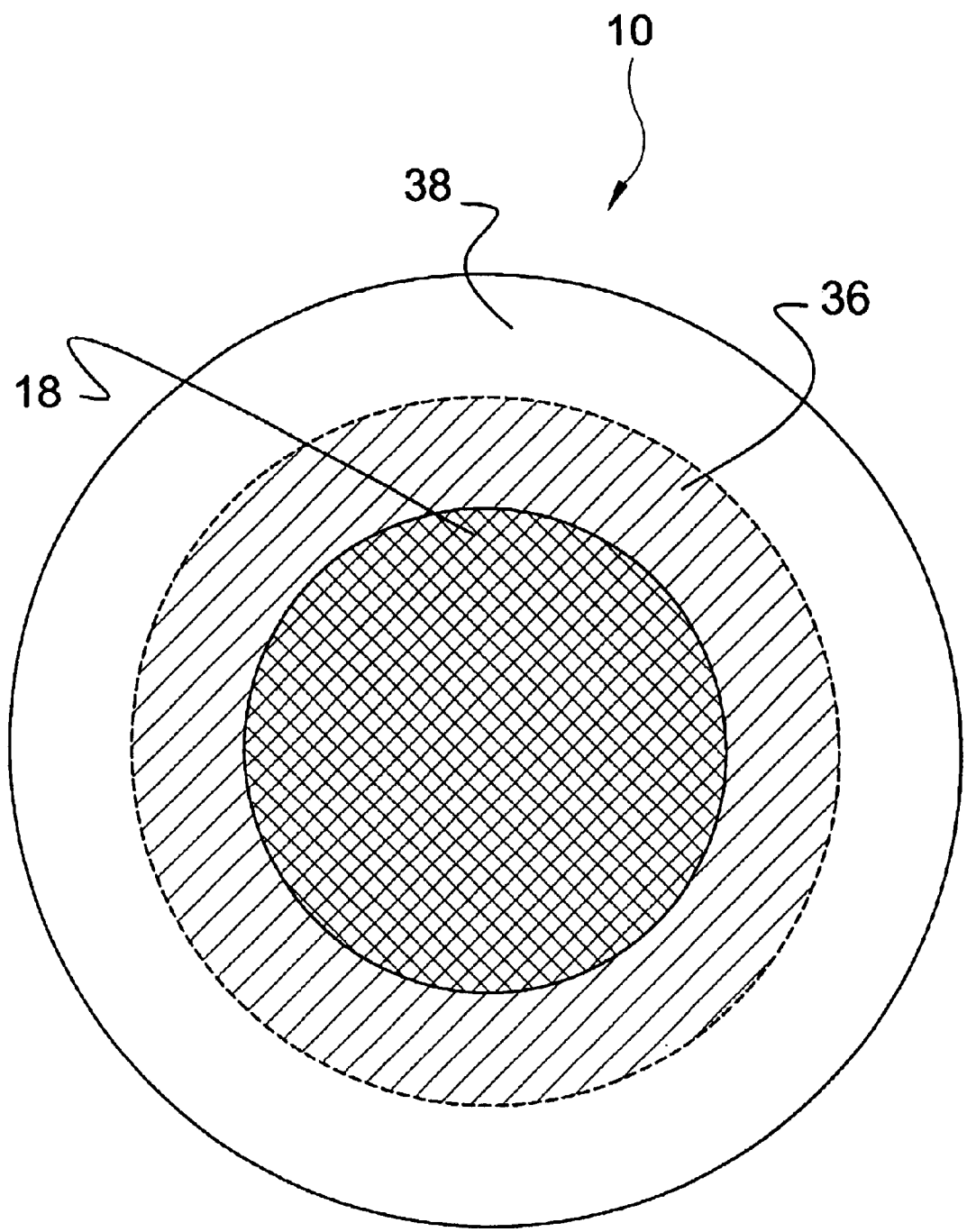
FIG. 7 is a front view of the present invention, polarized contact lenses.

FIG. 7 is a front view of the present invention, polarized contact lenses 10. The polarized element 18 is applied to the center portion of the lens 14 and is sized for the user's pupil 22. An optional coloring treatment can be used around the polarized area to suit the user's preference.

Figure 8:
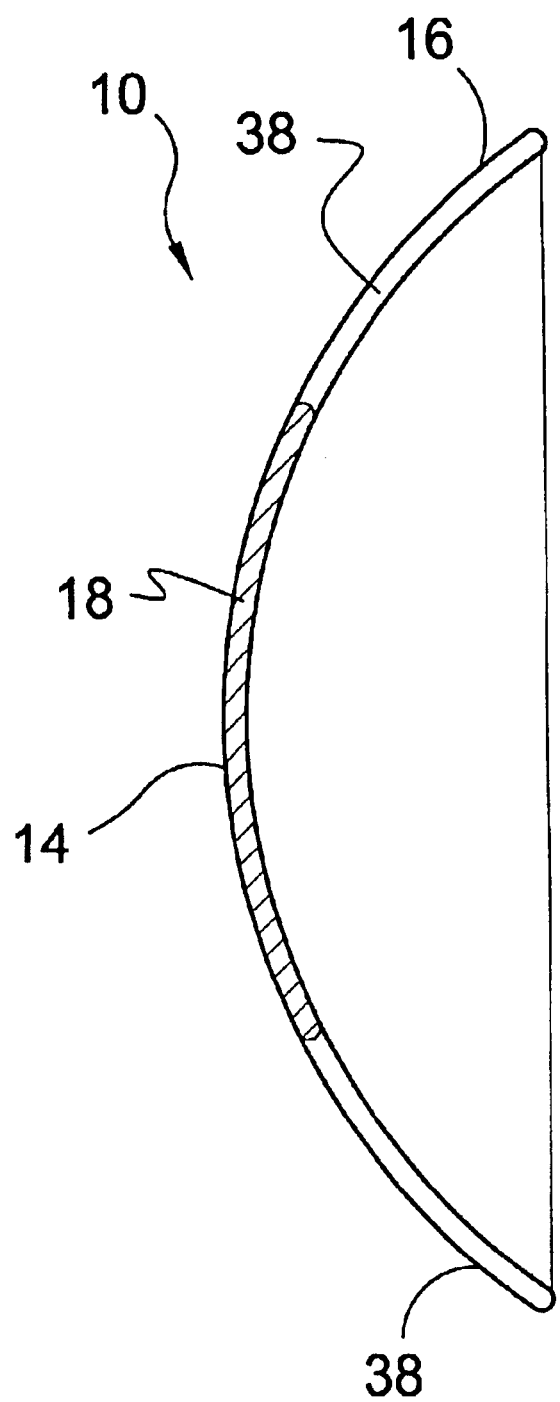
FIG. 8 is a sectional view of the present invention, polarized contact lenses.

FIG. 8 is a sectional view of the present invention, polarized contact lenses 10. Since the polarized element 18 is applied only to the center portion of the lens 14 concentric with the pupil 22, the lens is unnoticeable while in use. The polarized coloring blends with the pupil 22 while the untreated area around the polarized element 18 allows for a natural look.

Figure 9:
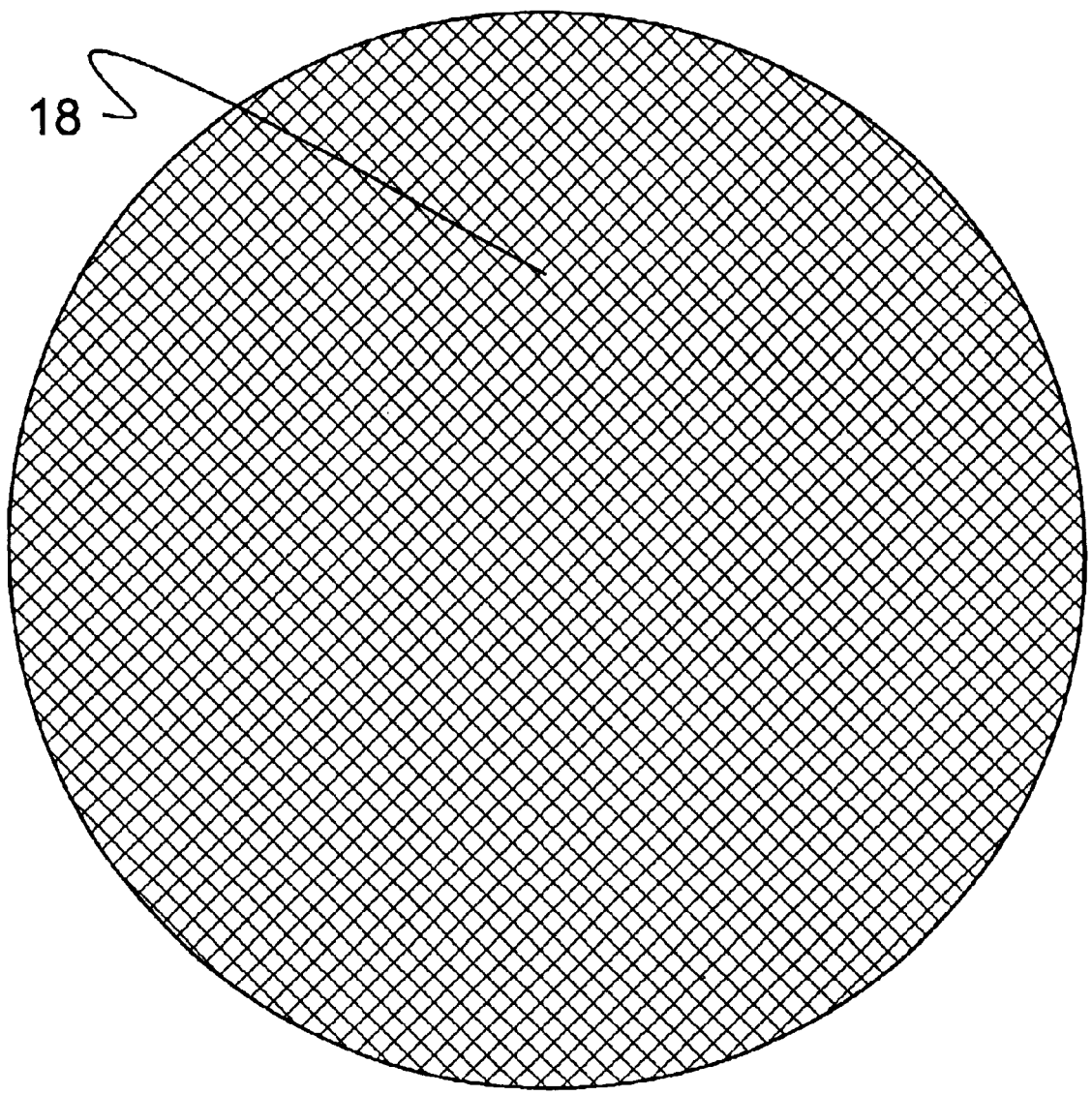
FIG. 9 is a front view of the present invention, preferred embodiment.

FIG. 9 is a front view of another embodiment of the present invention 10. In a preferred embodiment, the polarized element is applied to the entire lens. The increased area coverage provides maximum protection of the eye.

Figure 10:
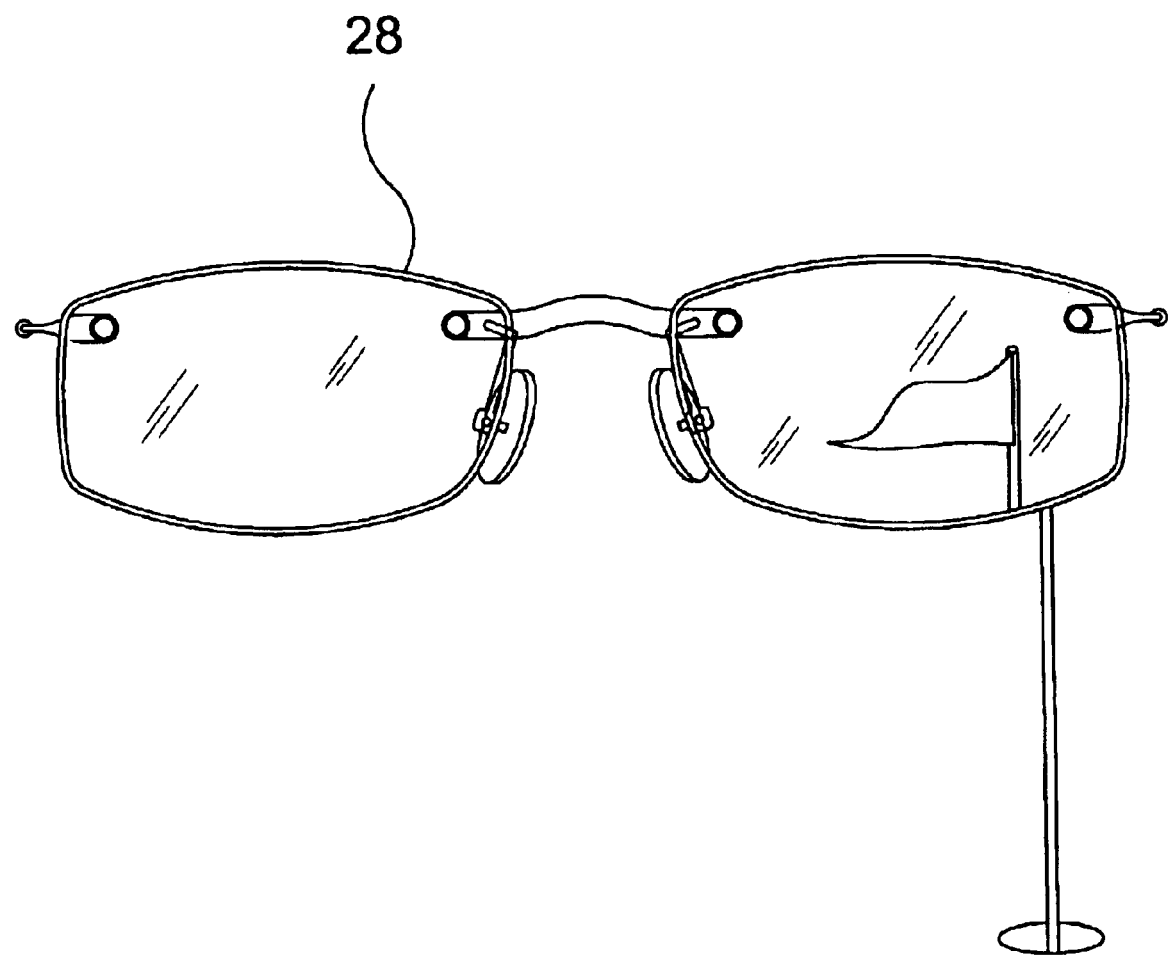
FIG. 10 is an illustrative view of prior art.

FIG. 10 is an illustrative view of prior art. Polarized elements 18 are utilized in sunglasses 28 but, in addition to other shortcomings described in previous figures, sunglass lenses cause a split or offset vision. With the contact lens directly affixed to the eye 20, this split or offset vision does not occur.

What is claimed as new and desired to be protected by Letters Patent is set forth in the appended claims:

1. A polarized contact lens comprising:
   a) a lens material having a central portion and a peripheral portion;
   b) a polarized element disposed on said central portion of said lens material to reduce glare and protect the eye of the user from damaging ultraviolet rays and the like; and
   c) said peripheral portion comprising an annular ring around said central portion tinted to change the appearance of a user's eye surrounded by the remainder of said contact lens being clear.

2. A polarized contact lens as recited in claim 1, wherein the diameter of said polarized element is at least equal to the diameter of the user's pupil when fully dilated.

3. A polarized contact lens as recited in claim 1, wherein said polarized element is vertically oriented.

4. A polarized contact lens as recited in claim 1, wherein said lens is corrective.

\* \* \* \* \*